United States Patent
Rudd et al.

(10) Patent No.: US 8,995,226 B2
(45) Date of Patent: Mar. 31, 2015

(54) MEASUREMENT METHOD AND APPARATUS

(75) Inventors: Wayne Rudd, Newcastle (GB); Allison Mason, legal representative, Cheltenham (GB); Laurie Linnett, North Berwick (GB)

(73) Assignee: Bios Developments Limited, Norfolk (GB)

( * ) Notice: Subject to any disclaimer, the term of this patent is extended or adjusted under 35 U.S.C. 154(b) by 0 days.

(21) Appl. No.: 13/167,426

(22) Filed: Jun. 23, 2011

(65) Prior Publication Data

US 2012/0133544 A1    May 31, 2012

Related U.S. Application Data

(63) Continuation of application No. 12/991,360, filed as application No. PCT/GB2009/001120 on May 6, 2009, now abandoned.

(30) Foreign Application Priority Data

May 6, 2008    (GB) .................................. 0808189.5

(51) Int. Cl.
    *G01S 13/36*    (2006.01)
    *G01S 15/10*    (2006.01)
    *G01S 15/36*    (2006.01)

(52) U.S. Cl.
    CPC ................ *G01S 15/101* (2013.01); *G01S 13/36* (2013.01); *G01S 15/36* (2013.01); *G01S 15/107* (2013.01)
    USPC .............. 367/125; 367/99; 367/100; 367/124

(58) Field of Classification Search
    USPC .............................. 367/99–101, 124–125, 127
    See application file for complete search history.

(56) References Cited

U.S. PATENT DOCUMENTS

| | | | | | |
|---|---|---|---|---|---|
| 3,327,307 | A | * | 6/1967 | Miles | 342/112 |
| 4,752,917 | A | * | 6/1988 | Dechape | 367/125 |
| 4,829,305 | A | * | 5/1989 | LaBudde | 342/127 |
| 5,333,493 | A |   | 8/1994 | Cutmore | |
| 6,703,967 | B1 |  | 3/2004 | Kuroda et al. | |
| 7,088,115 | B1 |  | 8/2006 | Glenn et al. | |
| 7,289,391 | B2 | * | 10/2007 | Tietjen et al. | 367/125 |
| 7,733,267 | B2 |  | 6/2010 | Baath | |
| 7,786,927 | B2 | * | 8/2010 | Kondoh | 342/109 |
| 2009/0066966 | A1 |  | 3/2009 | Baath | |

FOREIGN PATENT DOCUMENTS

| | | | | |
|---|---|---|---|---|
| GB | 2188420 | | 9/1987 | |
| JP | 61047579 | A * | 3/1986 | G01S 15/42 |

* cited by examiner

*Primary Examiner* — Ian J Lobo
(74) *Attorney, Agent, or Firm* — Meyertons, Hood, Kivlin, Kowert & Goetzel, P.C.; Eric B. Meyertons

(57) ABSTRACT

There is provided a method and associated apparatus for measurement. Specifically, a method for determining a distance travelled by a signal in a medium, or the time of flight of a signal travelled. The method comprises considering an unambiguous range wherein the unambiguous range greater than a distance to be travelled by a signal. A signal is then transmitted across the distance to be determined, the signal comprising at least two frequency components, the frequency components based on the unambiguous range and the speed of the signal in the medium. The distance travelled (or the time of flight) is determined by using the variance of the received phase characteristics, such as phase angle) of one frequency component of the received signal with the received phase characteristics of another frequency component of the received signal.

27 Claims, 9 Drawing Sheets

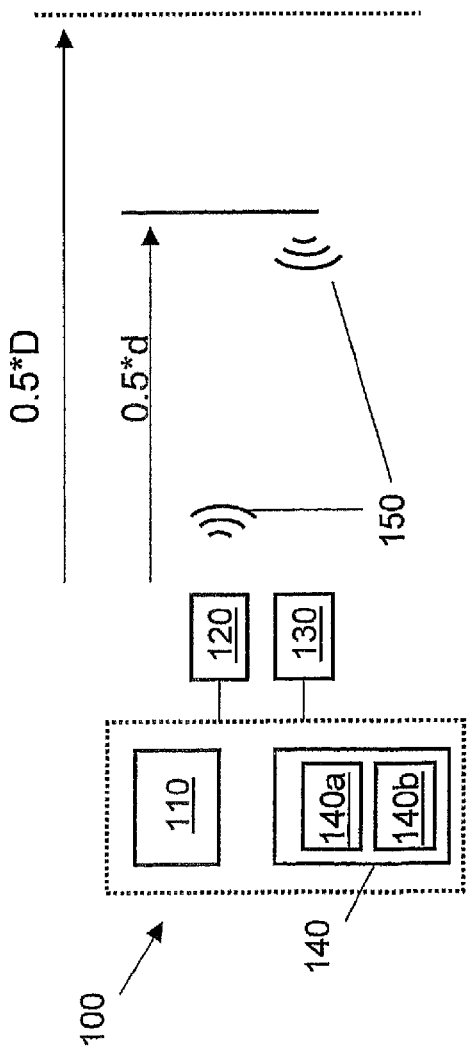
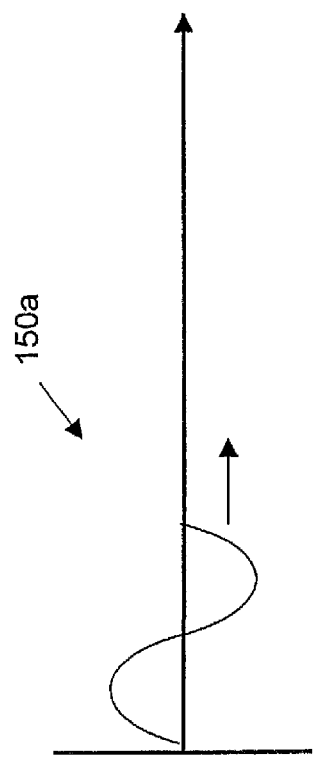

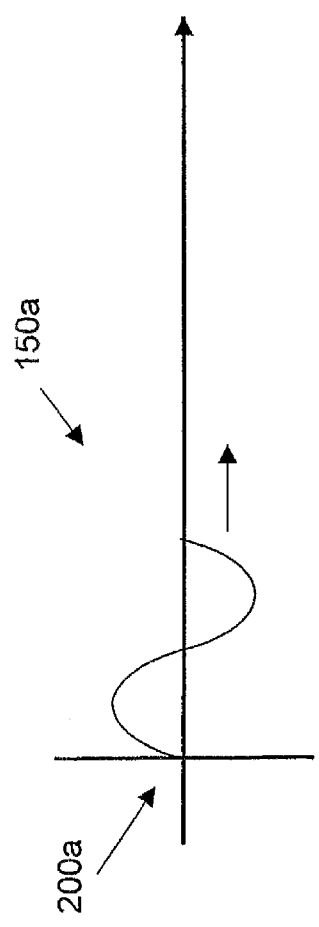
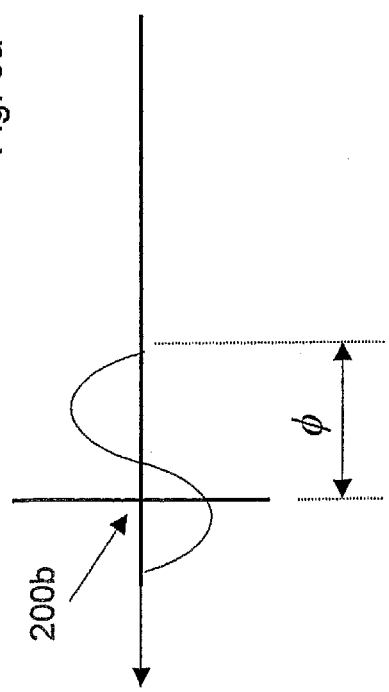

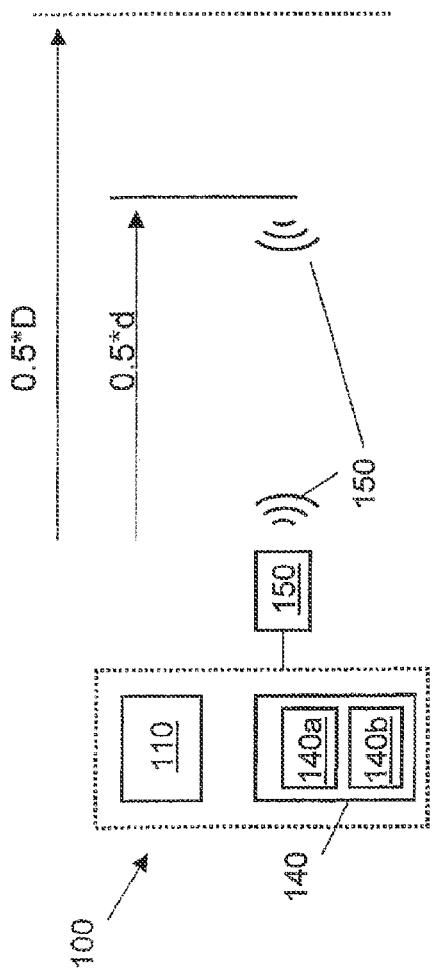
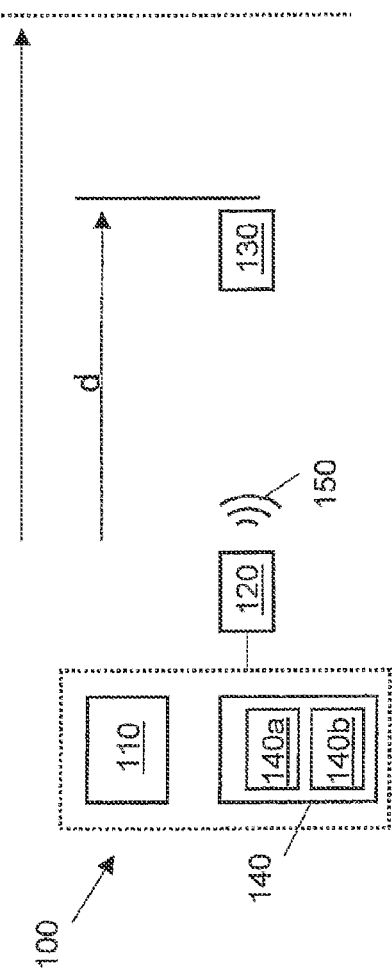

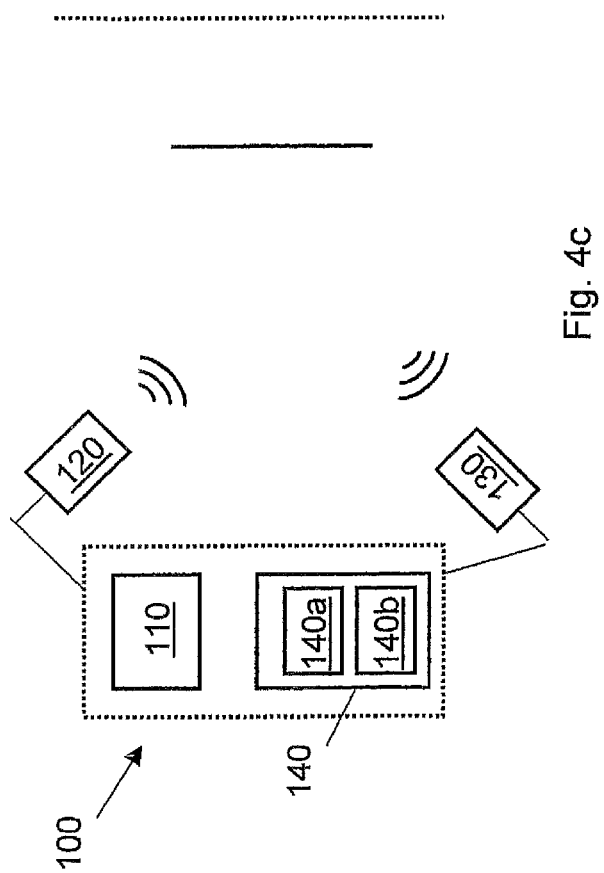

Graph illustrating the phase of received 1.50MHz signals

*Time v distance plot of least squares straight line for frequency pair $f_1f_4$*

Transmit / receive signal amplitude plotted
against time (μsecs) TX/RX distance=0mms.

Transmit / receive signal amplitude plotted
against time (μsecs) TX/RX distance=150mms.

Transmit / receive signal amplitude plotted against time (μsecs) TX/RX distance=90mms.

MEASUREMENT METHOD AND APPARATUS

PRIORITY CLAIM

This application is a Continuation of U.S. patent application Ser. No. 12/991,360 entitled "MEASUREMENT METHOD AND APPARATUS" filed on Nov. 5, 2010 now abandoned, which is the National Stage of International Application No. PCT/GB2009/001120, filed May 6, 2009 which claims priority to United Kingdom Application No. 0808189.5 filed May 6, 2008.

BACKGROUND OF THE INVENTION

1. Field of the Invention

This invention relates to measurement methods and apparatus. In particular, but not exclusively, the invention relates to methods and apparatus useful in the measurement of the time of flight of a signal, or distance travelled by a signal.

2. Description of the Relevant Art

There are many instances where it is useful to determine the time of flight of a signal. For example, where the speed of sound in a particular medium, such as air or water, is known, the time of flight of an acoustic signal through the medium between a signal transmitter and a signal receiver may be used to determine the distance travelled by the signal. While such measurement techniques are well known, for example in surveying tools, it can be difficult to achieve accurate results.

SUMMARY OF THE INVENTION

According to a first embodiment there is provided method for determining a distance travelled by a signal in a medium, the method comprising:

considering an unambiguous range, the unambiguous range greater than a distance to be travelled by a signal;

transmitting a signal across the distance to be determined, the signal comprising including at least two frequency components, the frequency components based on the unambiguous range and the speed of the signal in the medium;

receiving the signal; and determining the distance travelled by the signal by using the variance of the received phase characteristics of one frequency component of the received signal with the received phase characteristics of another frequency component of the received signal.

The method may comprise comparing the difference in the received phases of the frequency components. This may provide for determining the distance travelled by the signal.

Transmitting the signal may comprise transmitting at least two frequency components such that the number of cycles of one frequency component across the unambiguous range would be no greater than one more than the number of cycles of another frequency component across the unambiguous range.

The method may comprise transmitting and receiving a signal comprising more than two frequency components, each frequency component being incrementally different from another frequency component.

Each frequency component may be incrementally different from another frequency component. This may provide a Vernier effect. This may allow for determining the distance travelled by the signal.

The received phase characteristic of a first frequency component may be used with the received phase characteristic of each other frequency component in the signal so as to provide for determining the distance travelled. For example, the first frequency component may be compared with the second frequency component, and the third frequency component, (then) the fourth frequency component, etc.

The distance may be determined by using the difference in the number of cycles travelled by a first frequency component across the distance and the number of cycles travelled by each subsequent frequency component across the undetermined distance. For example, it may be determined that a third (or fourth, fifth, etc) frequency component travelled 50, 60, etc. cycles more than a first frequency component, which may provide for determining the distance travelled by the signal.

The method may comprise comparing the received phase characteristic of the at least two frequency components to be the roughly same by changing at least one of the frequency components in the signal so as to determine the distance travelled by the signal.

The method may comprise determining the distance by using an average value of phase characteristic. The average value may be the average of the received phase characteristic of one frequency component and the received phase characteristic of another changed frequency component.

The method may comprise determining the distance by using the average value of phase characteristic to provide at least two evaluated times of flight, such as at least two evaluated times of flight for corresponding at least two frequency components. The evaluated times of flight may be based on a different integer number of cycles travelled by the at least two frequency component across the distance.

The distance may be determined by using the integer number of cycles providing the smallest absolute difference in the evaluated time of flight of the two or more frequency components.

The distance travelled by the signal may be the distance to one or more targets.

The method may comprise, such as further comprise determining the time of flight of the signal. The signal may comprise an acoustic signal, electromagnetic signal, etc.

The distance may be a distance in a pipeline, such as an oil and gas pipeline, or a subterranean distance, or the like.

The at least two frequency components may be transmitted simultaneously, or at intervals. The signal may be cumulative signal comprising the two or more frequency components.

A plurality of signals may be transmitted and received in order to determine the distance travelled by the signals.

The variance of the received phase characteristics of a frequency component in the received signal may be determined by comparing a sampled phase of the received frequency component with a transmitted phase, or expected transmitted phase of that frequency component.

The variance of the received phase characteristics of the at least two frequency components in the received signal may be determined by comparing a sampled phase of one received frequency component with a sampled phase of another received frequency component.

The method may (further) comprise compensating for phase error in the at least two frequency components so as to determine the distance.

The at least two frequency components may be provided by providing at least two wavelength components.

The speed of the signal in the medium may be known, estimated, or guessed in order to provide the at least two wavelength components.

According to a further embodiment there is provided a method for determining a time of flight of a signal in a medium, the method comprising:

considering an unambiguous range, the unambiguous range greater than a distance to be travelled by a signal;

transmitting a signal across the distance in a medium, the signal comprising at least two frequency components, the frequency components based on the unambiguous range and the speed of the signal in the medium;

receiving the signal; and determining the time of flight of the signal travelling across the distance by using the variance of the received phase characteristics of one frequency component of the received signal with the received phase characteristics of another frequency component of the received signal.

According to a further embodiment there is provided a method for determining a distance travelled by a received signal in a medium, the method comprising:

determining the distance travelled by a received signal by using the variance of a received phase characteristics of one frequency component of the received signal with a received phase characteristics of another frequency component of the received signal, the received signal having at least two frequency components, the frequency components based on an unambiguous range, the unambiguous range greater than a distance travelled by the received signal in the medium, and the speed of the signal in the medium.

According to a further embodiment there is provided a method for determining a time of flight of a received signal in a medium, the method comprising:

determining the time of flight of a received signal having travelled a distance in a medium by using the variance of a received phase characteristics of one frequency component of the received signal with a received phase characteristics of another frequency component of the received signal, the received signal having at least two frequency components, the frequency components based on an unambiguous range, the unambiguous range greater than a distance travelled by the received signal in the medium, and the speed of the signal in the medium.

The methods of the preceding embodiments may additionally comprise determining the distance to one or more targets.

The received phase characteristic may be the received phase angle of the frequency component.

According to a further embodiment there is provided a computer program provided on a computer readable medium, the computer program configured to provide the method of any of the above aspects.

According to a further embodiment there is provided apparatus for determining a distance travelled by a signal in a medium, the apparatus comprising:

a transmitter configured to transmit a signal comprising at least two frequency components, the frequency components based on an unambiguous range, the unambiguous range greater than an distance to be travelled by a signal and the speed of a signal in the medium;

a receiver configured to receive a transmitted signal comprising the at least two frequency components, wherein the apparatus is configured to determine a distance travelled by a signal by using the variance in a received phase characteristics of one frequency component of a received signal with a received phase characteristics of another frequency component of a received signal.

The apparatus may be configured to compare the difference in received phases of frequency components so as to provide for determining the undetermined distance.

The apparatus may be configured to compare received phase characteristics of the at least two frequency components to be the roughly same by being configured to change at least one of the frequency components in a transmitted signal so as to determine a distance travelled.

The received phase characteristic is the received phase angle of the frequency component.

According to a further embodiment there is provided a measurement device comprising the apparatus according to any of the preceding embodiments. The device may be an oil and gas measurement device, or subterranean measurement device.

According to a further embodiment there is provided method for determining a distance travelled by a means for signaling in a means for communicating a means for signaling, the method comprising:

considering an unambiguous range, the unambiguous range greater than a distance to be travelled by a means for signaling;

transmitting a means for signaling across the distance to be determined, the means for signaling comprising at least two frequency components, the frequency components based on the unambiguous range and the speed of the means for signaling in the means for communicating a means for signaling;

receiving the means for signaling; and determining the distance travelled by the means for signaling by using the variance of the received means for characterizing the phase of one frequency component of the received signal with the received means for characteristics the phase of another frequency component of the received means for signaling.

According to a further embodiment there is provided means for determining a distance travelled by a signal in a medium, the means for determining a distance comprising:

a means for transmitting a signal, the means for transmitting configured to transmit a signal comprising at least two frequency components, the frequency components based on an unambiguous range, the unambiguous range greater than an distance to be travelled by a signal and the speed of a signal in the medium;

a means for receiving a signal, the means for receiving configured to receive a transmitted signal comprising the at least two frequency components, wherein the means for determining a distance is configured to determine a distance travelled by a signal by using the variance in a received phase characteristics of one frequency component of a received signal with a received phase characteristics of another frequency component of a received signal.

According to a further embodiment there is provided a method for determining a characteristic of a signal in a medium, the method comprising:

considering an unambiguous range, the unambiguous range greater than a distance to be travelled by a signal;

transmitting a signal across a distance, the signal comprising at least two frequency components, the frequency components based on the unambiguous range and the speed of the signal in the medium;

receiving the signal; and determining the characteristic of the signal by using the variance of the received phase characteristics of one frequency component of the received signal with the received phase characteristics of another frequency component of the received signal.

The characteristic may the distance travelled by the signal, the time of flight of the signal. The characteristic may be the time of flight of the signal.

According to a further aspect there is provided a method of measuring a characteristic of a signal, the method comprising:

transmitting a signal comprising at least two discrete frequency components;
receiving the signal; and
determining a variance between a common characteristic of the received signal components, wherein said variance is indicative of a characteristic of the signal.

According to another embodiment there is provided signal processing apparatus comprising:

a transmitter adapted to transmit a signal comprising at least two discrete frequency components; and
a receiver adapted to receive the signals and determine a variance of a common characteristic of the received signal components indicative of a characteristic of the signal.

From determining the variance of the characteristic of the frequency components of the received signal it may be possible to then determine, for example, a feature or parameter of the signal, such as the distance travelled by the signal or the time of flight of the signal. The determined time of flight of the signal, or the distance travelled by the signal, may in itself be useful to an operator, or may be utilized to derive or determine further useful information. It has been found that, using these embodiments, a high degree of accuracy in measuring time and distance can be achieved.

The variance may be between a wave characteristic of the received signal frequency components, which characteristic may include phase or amplitude. Thus, for example, the variance may be a difference in phase or phase characteristics between the different frequency components of the received signal.

An initial property of the common characteristic of the transmitted frequency components may be known, for example the phase of the frequency components of the transmitted signal may be known. The initial properties of the common characteristic of the components of the transmitted signal may be the same, to facilitate signal analysis. Thus, the phase of the frequency components of the transmitted signal may be the same. For example, the initial phase of both components of the signal may be zero.

The signals may be reflected between the transmitter and receiver, and may be reflected by a target. Alternatively, or in addition, the signal may pass through at least one material between the transmitter and the receiver, and at least one material may include a target. There may be only one target, or a plurality of targets.

The signal may be an acoustic signal, or may be an electromagnetic (EM) signal.

The signal flight path distance or range between the transmitter and the receiver may be predetermined. The frequencies of the components of the transmitted signal may be selected such that the number of cycles of each frequency which may be accommodated in the distance between the transmitter and the receiver varies by no more than one. This is referred to herein as the unambiguous range, and facilitates analysis of the signals by Fourier Transform. Also, this may permit the method and apparatus to distinguish between multiple received signals, for example: a single signal may be reflected by a target surface and also by one or more other surfaces such that the receiver detects the reflected target signal and one or more spurious reflected signals. Reflected signal components having characteristics indicative of a flight path distance greater than the unambiguous range, indicative of reflection from a surface other than the target surface, may be identified and discounted.

The signal may include three or more discrete frequency components. The method may comprise determining the variance between the common characteristic of first and second discrete frequency components, and then determining the variance between first and third discrete frequency components, and so on.

In one embodiment, the frequencies of first and second components of the transmitted signal are selected such that the number of cycles of each frequency which may be accommodated in the distance travelled by the signal between the transmitter and the receiver varies by no more than one, and a step of the method comprises determining the phase variance between the first and second components. This phase variance may be utilized to determine or estimate other information, including the time of flight of the signal and the difference in the number of cycles between the first and second components. This first determined time or number of cycles may be considered a first estimate. A third frequency may then be selected such that the number of cycles of the first and third frequency may vary by more than one, for example by up to ten. The method may comprise the step of identifying the difference in the number of cycles between the first and third components, by selecting the number of cycles, for example, between one and ten, which provides the closest match to, for example, the first time estimate. This provides a more accurate second estimate of time or other information, in a somewhat similar fashion to a Vernier scale. The method may then comprise the further step of selecting a fourth frequency, such that the number of cycles between the first and fourth frequencies varies by a larger number, for example by up to 100. The method may comprise the step of then identifying the difference in the number of cycles between the first and fourth components, by selecting the number of cycles, for example, between one and 100, providing the closest match to the second time estimate. This provides a more accurate third estimate, which may be used to derive accurate information relating to the target. Clearly, further higher frequencies may be selected and utilized to further improve accuracy.

In another embodiment, a third frequency may be selected such that the number of cycles of the second and third frequency may vary by no more than one, and such that the number of cycles of the first and third frequency may vary by no more than two. The method may comprise determining the phase variance between the first and third components, and utilizing this information. This process may be repeated for further frequencies, with adjacent frequencies varying by one or less, to achieve greater accuracy.

In a further embodiment, the phase return of the first frequency component may be measured and then adjacent frequencies searched or otherwise determined to identify a frequency that returns the same phase, indicative of a frequency that has exactly one more cycle within the distance. By algebraic manipulation the distance between the transmitter and receive may then be calculated with a degree of accuracy.

Accurately detecting and analyzing a signal can be difficult, and in certain embodiments this difficulty may be addressed. For example, the transmitted signal length and received signal sampling interval may be selected such that the received signal is sampled intermediate between the start and end of the received signal reaching the receiver. This received signal sampling interval or window may be selected such that there are an integer number of cycles of each frequency component within the sampling interval.

The sampling frequency of the received signal may be greater than twice the highest frequency in the signal, sometimes known as the Nyquist criterion, to facilitate Fourier analysis.

The frequency components of a signal may be transmitted simultaneously, or may be transmitted at intervals. Thus, the frequency components of the received signal may be received simultaneously, or at intervals. When the components are transmitted simultaneously the former signal may be described as a ladder signal, and when the components are transmitted at intervals the signal may be described as a step signal.

A plurality of signals may be transmitted and received. The characteristics of second or subsequent signals may be determined by the variance determined from the first or previous signal, or from some other characteristic of the first or previous received signal. For example, the amplitude of signals reflected by a target may vary depending on the frequency, and the frequency components of subsequent signals may be selected, based on the amplitude of previous signals, with a view to obtaining higher amplitude reflected signals.

A plurality of signals may be transmitted simultaneously, or may be transmitted at intervals. The frequency of the components of the signals may differ, allowing the receiver to distinguish between multiple received signals.

Only a single transmitter or receiver may be utilized, and may transmit or receive multiple signals. Alternatively, a plurality of transmitters or receivers may be utilized. Each transmitter or receiver may transmit or receive a single signal or multiple signals. The transmitters may transmit signals having different frequency components. Use of the different discrete frequency components in different signals facilitates the receivers distinguishing between multiple received signals at a respective receiver: within a selected time interval a receiver may only process a predetermined frequency pair, associated with a signal transmitted from a particular receiver. Other frequency pairs, as transmitted by other receivers, are ignored. Alternatively, different frequency pairs may be processed in parallel. This facilitates provision of a multitude of transmitters and receivers in close proximity, facilitating rapid or real time detailed analysis of a particular target.

Variance or relative variance between the common characteristic of the received signal components may be affected by a number of factors. The devices used in the apparatus, such as the transmitters and the receivers, may introduce offsets which may be identified and corrected for greater accuracy. Also, passing a signal through or reflecting a signal from a particular material may introduce a material specific offset in a signal characteristic. For example, passing a signal through a material will tend to introduce a material specific phase offset. This property may be utilized to advantage in certain embodiments.

In an embodiment a variance is measured or otherwise determined. The variance may itself provide an operator with useful information, or the variance may be utilized or manipulated together with additional information, which may be predetermined, measured or otherwise. For brevity, the term "variance" or "determined variance" is used herein to indicate determined or measured variance, and also information subsequently derived from the variance in combination with other information. For example, a phase variance may be measured and then manipulated with other signal characteristics, such as frequency or velocity to determine distance and thus time of flight.

The method may further comprise the step of comparing the determined variance with a variance which is known or has been previously determined from passing signals through or reflecting signals from one or more target of known or controlled materials, properties or characteristics. The previously determined variance may be indicative of, for example, material composition, phase, crystallinity, form, density, porosity, temperature, or thickness. Thus, the method and apparatus may be used to, for example, non-intrusively and remotely identify characteristics of materials, such as in a geological survey, or in the human body.

The determined variance may be may be directly utilized to determine the characteristic of a target, for example by comparing the determined variance against predetermined variances contained in a look-up table or the like, each predetermined variance being indicative of a particular target characteristic. Alternatively, or in addition, the determined variance may be algebraically manipulated to indirectly determine a characteristic of the target.

Variances may be obtained for a range of test samples of a particular material, for example samples of increasing thickness, such that the time of flight of the signal between the transmitter and receiver increases. The variances for the different samples may be collated in a convenient form, for example by graphing the results for a particular frequency pair in different test samples. Such differences may be used to place values on a time v. distance graph. In a particular embodiment, where variance in phase is determined, a line drawn through such results will intercept the time axis to provide a measure of relative phase offset, and provides a correction factor for phase offset between the two frequencies. By repeating the process for a plurality of frequency pairs it is possible to create a phase/frequency calibration database for a particular material.

This process may then be repeated, using the same frequency pairs, for a range of different materials. For example, for use as a surveying tool, phase/frequency calibration figures may be obtained for a range of materials likely to be encountered during a surveying operation. A survey is then carried out using the method of this embodiment and phase variances are determined for the same frequency pairs. A material is selected from the database and the phase correction for that material is applied to the phase variances obtained by the survey to convert the determined phase variances to time of flight values for each frequency pair. If the material selected from the database and the surveyed material are the same the determined time values for each frequency pair will match closely (the time of flight for the different frequency pairs through the material should coincide). If the materials are not the same there will be no correlation between the phase corrected time values for the different frequency pairs, indicative that the phase correction is not appropriate for the surveyed material. Thus, it is possible to identify a material using these embodiments. This method may also be utilized to distinguish the presence of particular characteristics of a single material, for example the method may be utilized to identify the phase or temperature of a material.

The invention includes one or more corresponding aspects, embodiments or features in isolation or in various combinations whether or not specifically stated (including claimed) in that combination or in isolation. Corresponding means for performing one or more of the discussed functions are also within the present disclosure. It will be appreciated that one or more embodiments/aspects may be useful in determining an undetermined distance, and/or determining a time of flight of a signal.

The above summary is intended to be merely exemplary and non-limiting.

BRIEF DESCRIPTION OF THE DRAWINGS

Advantages of the present invention will become apparent to those skilled in the art with the benefit of the following detailed description of embodiments and upon reference to the accompanying drawings in which:

FIG. 1 shows apparatus according to an embodiment of the invention;

FIG. 2 shows an exemplary frequency component;

FIG. 3 shows an exemplary frequency component;

FIG. 4 shows further configurations of apparatus;

Figure 5:
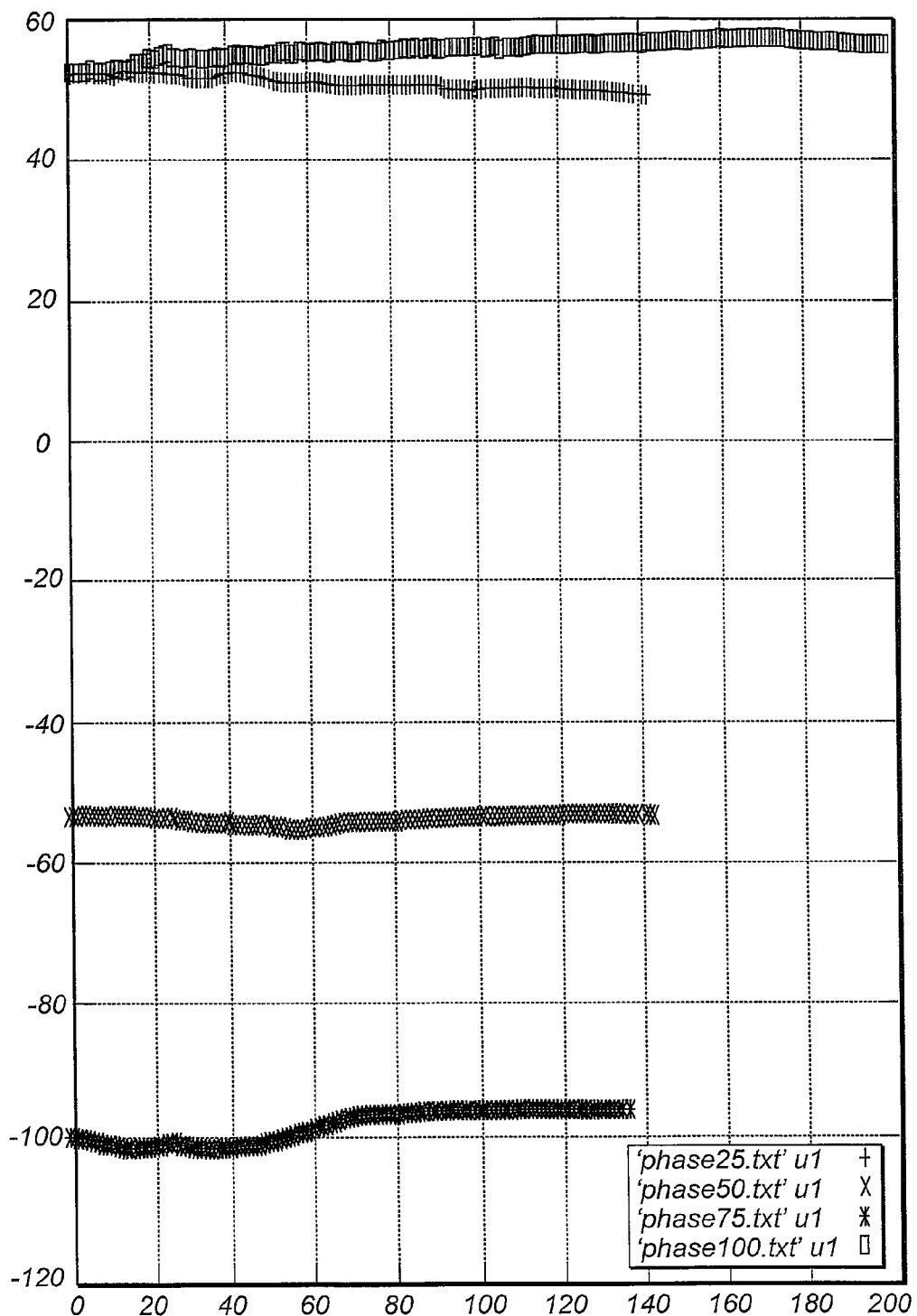
FIG. 5 is a graph illustrating the phase of received 1.50 MHz signals.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

Set out below is a description of the use of phase measurement to estimate distance (or time) in accordance with an embodiment of the present invention. The examples are for sound in water.

Distance Measurement

Consider sending out a pulse or continuous signal, such as an acoustic signal, having a single frequency. The initial phase offset of the frequency is zero for convenience. That is to say that the phase at which the signal is emitted from a transmitter is zero.

The signal pulse, or continuous signal, travels out, hits a target and returns (e.g. is reflected off a particular material, such a when a change of impedance of material occurs). We capture the signal and measure the phase of the returned pulse at the frequency transmitted. It is possible to determine the characteristics of received signals by observing the received signal, such as observing the received signal at particular time intervals (e.g. sampling the received signal). The amplitude and phase of such a sampled signal can be determined at those time intervals.

Normally we would time the pulse (or time taken to emit and then receive a continuous signal) and assuming a value for the velocity of sound in the medium we can estimate the target distance. For simplicity let us assume that we only sent out a single cycle of the frequency. Let the frequency be $f_1$ Hz and let the wavelength be $\lambda_1$. If D is the distance to the target, there are $(D/\lambda_1)$ full cycles; this is an integer number, let it be $n_1$. We also have a residual fractional cycle left which we actually measure as the phase, let this be $r_1$. This phase is $\phi_1$. So we have for this single frequency, where v is the velocity of sound in the medium:

$$D = n_1 \lambda_1 + r_1 = n_1 \lambda_1 + \frac{\phi_1}{360}\lambda_1 = \frac{v}{f_1}\left(n_1 + \frac{\phi_1}{360}\right) \quad \text{Equation 1}$$

We use the fact that $v=f\lambda$. D, $\lambda_1$, $r_1$ are in meters and $n_1$ is an integer. All we know is $f_1$ (and thus $\lambda_1$ since we assume we know the speed of sound; the speed may be guessed, estimated, measured, known, etc.) and also $\phi_1$. Knowing $\phi_1$ in degrees we can measure the residual cycle distance as $r_1 = \phi_1 \lambda_1/(360)$ meters.

If we send out a second frequency (let it be $f_2$) within the same pulse as the first then it will also have associated with it a wavelength, residual phase, etc. So we can write a second equation as:

$$D = n_2 \lambda_2 + \frac{\phi_2}{360}\lambda_2 = \frac{v}{f_2}\left(n_2 + \frac{\phi_2}{360}\right) \quad \text{Equation 2}$$

Again all we know about this is the frequency ($f_2$ and $\lambda_2$) and residual phase return ($\phi_2$).

In some instances the phase measurement can be provided by measuring the phase (or amplitude) of a received signal and comparing this with the phase (or amplitude) of the transmitted signal had it been transmitted at the time of observing the received signal. For example, the phase of the received signal may be compared with the phase of an simulated signal, both the simulated signal and the received signal emitted at the same time and having the same phase offset at that time. The difference between these two phases can be measured at the time of receipt of the signal as the phase of that received signal.

Unambiguous Range Measurement

We can solve equations (1), (2) by finding $(2)-(1)(\lambda_2/\lambda_1)$ and rearranging to give:

$$D\left(1 - \frac{\lambda_2}{\lambda_1}\right) = \lambda_2\left(\Delta n + \frac{\Delta\phi}{360}\right) \quad \text{Equation 3}$$

Using the fact that $v=f\lambda$ we obtain:

$$D = \frac{v}{\Delta f}\left(\Delta n + \frac{\Delta\phi}{360}\right) \quad \text{Equation 4}$$

Equation 4 is the fundamental equation. If we impose the condition that $\Delta n \leq 1$ then the equation can be solved.

The restriction that $\Delta n \leq 1$ can be imposed as follows. We choose a distance (D) within which we require unambiguous range measurements. We select a frequency $f_1$ with its corresponding wavelength $\lambda_1$. This will give $n_1$ cycles in this distance. We then select frequency $f_2$ with its corresponding wavelength $\lambda_2$ such that the number of cycles in D is $n_2 = n_1 + 1$. This distance is termed the Unambiguous Range (R) and using the two frequencies, $f_1$, $f_2$ any distance within this range can be determined unambiguously.

That is to say that the unambiguous range is a known or suggested distance that is anticipated to be greater than a distance that is to be measured or determined.

For example, suppose we decide on an unambiguous range of D=150 mms and we assume the speed of sound in water is v=1,500,000 mms/sec. We select $f_1$=2.0 MHz (an arbitrary value). This has $\lambda_1$=0.75 mms. In the distance D=150.0 mms this has 200.0 cycles. Thus $f_2$ will have 201.0 cycles in 150 mms. This gives $f_2$=2.01 MHz. Now suppose we have a distance of d=100.1234 mms (which would be unknown and is within the unambiguous range) and we wish to measure this. Frequency $f_1$ gives a phase measurement of $\phi_1$=179.232°. This is calculated as 100.1234(2.00)/1.5=133.497866 cycles. So $n_1$=133, the residual phase, which is what we want is 0.497866 cycles=0.497866(360)=179.232°. Similarly for $f_2$ we find the residual phase is $\phi_2$=59.528°. (134.165356 cycles, so $n_2$=134). So, $\Delta\phi=\phi_2-\phi_1$=59.528−179.232=−119.704°. We use this value in the formula given in equation 4. However, since $\Delta\phi$ is negative (this means $\Delta n$ is 1) we add 360 to this value giving 240.296° (if $\Delta\phi$ was positive we would have used the value directly).

That is to say that with the imposition of $\Delta n \leq 1$, it can be shown that if $\Delta\phi$ is positive, then $\Delta n$ in equation 4 is 1. If $\Delta\phi$ is negative, then $\Delta n$ in equation 4 is 0.

Now, $v$=1.5 mms/μSec, $\Delta f$=10,000 Hz and this gives d=100.1233 mms as required.

The Unambiguous Range is R=$v/\Delta f$, and is independent of the actual frequencies and only depends on the difference in frequencies.

Practical Measurements and Accuracy

The method described above assumes it is possible to measure the phases precisely. In practice this is not readily achievable and limitations must be put on this accuracy. For example, if we measured phase to ±0.5°, then the phases in the example above become $\phi_1$=60.0 and $\phi_2$=179.0, giving d=100.4166 mms. We now have an error of 0.2932 mms. This can be improved upon as described below.

Using Multiple Frequencies—Method A(i)

In equation 4, we imposed the condition that $\Delta n \leq 1$. We used this to advantage with frequencies $f_1$, $f_2$. However, now we have an estimate of the distance (e.g. 100.4166 mms), let us introduce a third frequency $f_3$=2.10 MHz. $f_2$ differed from $f_1$ by 10 KHz. Now $f_3$ differs from $f_1$ by 100 KHz. The phase for $f_3$ over the distance 100.1234 mms is 140.172760 cycles. So $n_3$=140 and $\phi_3$=62.193° which we measure as 62.0°. So $\Delta\phi_{31}$=62−179=−117. We add 360 to give 243°. However, $\Delta n$ between $f_1$ and $f_3$ is now 7 (in fact 6, since we have already added in 360 to make the phase difference positive). We use equation 4 with this $\Delta\phi$ and we use values of $\Delta n$ as 0, 1, 2 etc. When we find a value for D closest to that estimated previously we use that value.

In this instance, we find that the closest match to the previous estimate is when $\Delta n$=6 and this then gives d=100.125 mms (an error of 0.0016 mms). So we have an estimate correct to the second decimal place, even though our phase estimates are to the nearest 0.5°.

In some instances, $\Delta n$ may not be selected as 1, 2, 3, etc., but may be selected 2, 8, 3, 7, (e.g. to iterate to an solution).

In this example, if we now introduce a $4^{th}$ frequency $f_4$=3.0 MHz, such that the $\Delta f=f_4-f_1$=1.0 MHz we now find $\phi_4$=200.2468 cycles giving $\phi_4$=88.848° which we measure as 89°. So now, $\Delta\phi_{41}$=89−179=−90+360=270. Again we cycle through the $\Delta n$ until we get closest to our last estimate.

This occurs this time at $\Delta n$=66 giving d=100.125 mms. This is the same as last time and our final error is 0.0016 mms=1.6 microns.

In this example, the cycling through $\Delta n$ can start at 60, and/or stop at 70, because we have observed than $\Delta n$ at 6, and not 7 for $f_3$. If $\Delta n$ had been 7, then cycling might start at 70, and/or stop at 80, etc. Again cycling may include iterating between numbers.

This example can be continued for further frequencies in a similar manner so as to improve resolution of the unknown distance, d.

Of course, in any of the above examples, after the unknown distance has been determined, the time of flight can be determined by using the speed of the signals in the medium and the unknown distance.

Using Multiple Frequencies—Method A (ii)

As shown above if we measure the phase to within 0.5°, then the accuracy is limited to about 0.3 mms with two frequencies because of the imposition that $\Delta n \leq 1$. We then showed that if we relaxed this then we could get more accuracy. Here we show how to use a range of frequencies to extend the value of $\Delta n$ in steps of 1. We chose two frequencies as say $f_0$ and $f_1$, with $f_1-f_0=\Delta f$ Hz. Now we could choose $f_{-1}$ with $f_0-f_{-1}=\Delta f$ Hz. Now, we can detect a change in $\Delta n$ of up to 2 cycles and we have doubled the accuracy. For example, if $f_0$=2.0 MHz, then we could make $f_{-1}$=1.99 MHz and $f_1$=2.01 MHz. This would be for an unambiguous range of D=150 mms in water. Suppose we had a distance to measure of 99 mms. If we use $f_{-1}$ and $f_0$ this calculates the result correctly and indicates $\Delta n$=1. Similarly, using $f_0$ and $f_1$ this also calculates the result correctly and indicates $\Delta n$=1. So using $f_{-1}$ and $f_1$ we can use the fact that $\Delta n$=2 and add in 2(360) degrees.

Continuing this argument, we could use 11 frequencies with end frequencies of $f_{-5}$=1.95 MHz and $f_5$=2.05 MHz and the other adjacent frequencies differing by 0.01 MHz. This would allow us to detect $\Delta n$ up to 10.

Suppose we had measured with 11 pairs and we find that two of the 10 pairs give negative phase differences, so when we measure between $f_5$ and $f_{-5}$ we get the $\Delta\phi$ and find that its negative and we must add in 2(360)=720°. Note that we must actually measure the phase difference between $f_5$ and $f_{-5}$ and that we cannot simply add up all the phase differences since then we add the errors. Measuring the actual difference between $f_5$ and $f_{-5}$ means that we only have one round off error not 10, but now we know we can compensate for $\Delta n \leq 10$.

Alternative Method with Two Frequencies—Method B

We choose an arbitrary frequency, $f_1$=2.0 MHz (for convenience). We have an unknown distance (in this case d=100.1234 mms). We measure the phase return of $f_1$ over this distance and obtain $\phi_1$=179.232°. We now search through the frequencies, such as neighboring/adjacent frequencies (higher and/or lower), until we find a frequency that returns the same phase. In theory, this frequency ($f_2$) should be $f_1+v/d$. This means that this frequency had exactly one more cycle within the distance. In this case $f_2$=2.0149815 MHz. We use equations (1), (2) as follows:

$$D = \frac{v}{f_1}\left(n + \frac{\phi_1}{360}\right) \quad \text{Equation 5}$$

$$D = \frac{v}{f_2}\left(n + 1 + \frac{\phi_1}{360}\right) \quad \text{Equation 6}$$

Subtracting and rearranging we obtain:

$$n = \frac{f_1}{f_2-f_1} - \frac{\phi_1}{360} \quad \text{Equation 7}$$

where n must be an integer. We then use this value of n in equation 5 to obtain D. In the example, d=100.1234 mms, $f_1$=2.0 MHz, $\phi_1$=179.232°, $f_2$=2.014981 MHz (to nearest Hz). This gives n=133.0052=133 (using equation (7)). Using this in equation (5) with $\phi_1$=179° (i.e. a roughly measured phase with +/−0.5)° we obtain d=100.1229 mms, an error of only 0.5 microns.

If we have errors in estimating $f_2$ the technique is robust to this. For example, if we estimate $f_2$=2.014931 MHz (an error of 50 Hz), we obtain n=133.452 so we still use n=133. The method still relies on an accurate estimate, or measurement, of $\phi$.

In practice we measure $\phi_1$ and then look for $f_2$ (i.e. send transmit a varying frequency signal, which may be analoguelly varying, or incrementally varying) until we find a close match to $\phi_1$. We use this value as $\phi_2$. The average of the two (the observed $\phi_1$ and observed $\phi_1$) as our estimate of $\phi_1$ (for the purposes of using with Equation 5, for example). When computing n we may be one out. So we compute the two times, $t_1$, $t_2$ (i.e. the time of flight) using our estimate of $\phi_1$ and with the $f_1$, $f_2$ found for values of (n−1), n, (n+1). The one giving the smallest absolute difference between $t_1$, $t_2$ is the correct value for n and we use this for the distance estimate.

Method B—Further Comments

If we had our two arbitrary frequencies, $f_1$=2.00, $f_2$=2.01 MHz, as we have in the first stage of "Vernier" method A, we return phases $\phi_1$, $\phi_2$. Within the unambiguous range (R), $\Delta\phi \leq 360$. In Method B, we show that, in use, the unknown frequency f, gives a $\Delta\phi$=360. So the unknown frequency which gives 1 more cycle than $f_1$ in the distance d must be f=$f_1$+$\Delta f$/($\Delta\phi$/360). Using the figures given in Method A, we obtained $\Delta\phi$=240.296° for $f_1$, $f_2$ as above. This gives f=2.0149815 MHz which is the correct frequency for one cycle difference in that distance.

However, if we use $f_1$, $f_2$ as given without searching, we can use equations (1), (2) to find n. n should be an integer which we then reuse in these equations to give $t_1$, $t_2$, which we average to give the best t. We then use values of n−1, n, n+1 to find the exact integer n and hence the best t. However, we find that if we use the value of n found as a real number (not an integer value) then we obtain the same value of t as in method A.

For example, if we use $\phi_1$=179 and $\phi_2$=60 then we obtain n=133.392. We try n=132, 133, 134 and:

Using n=132, $t_1$=66.249 µS, $t_2$=66.252 µS which has $\Delta t$=0.003 µS.

Using n=133, $t_1$=66.749 µS, $t_2$=66.749 µS which has $\Delta t$=0.001 µS.

Using n=134, $t_1$=67.249 µS, $t_2$=67.247 µS which has $\Delta t$=0.002 µS.

So we use n=133 and get t=66.749 µS.

If we had used n=133.392 we get $t_1$=$t_2$=66.944 µS, which is the same as method A, using t=($\Delta\phi$/360)/$\Delta f$. The exact value for t=66.749 µS.

Phase Offset Measurement Calibration

So far we have assumed that the phases that are transmitted and received are all as we expect. That is, there is no phase error on transmission or reception. We have assumed that all frequencies have zero phase offset with respect to each other. A first signal having a first frequency is transmitted with an initial phase of zero, as is a second signal having a second frequency at a corresponding time. In practice this is almost certainly not the case and this relative phase offset between frequencies must be measured and compensated for in accurate work.

Consider using two frequencies $f_1$=2.0 MHz and $f_2$=2.01 MHz. From previous examples looked at we know that in water (v=1.5 mms/µSec) we have an unambiguous range of 150 mms and that $\Delta n$ is 0 or 1. We know that:

$$\frac{D}{v} = t = \frac{n + \frac{\phi}{360}}{f} \qquad \text{Equation 8}$$

We set up two distances (times) and we assume n is the same for both frequencies over these distances. Also we assume that the actual phase measured is the distance phase plus a phase offset for that frequency.

As an example suppose that the (unknown) phase offset for $f_1$ is 10° and for $f_2$ is 30°. That is to say, that when (i.e. the time at which) we believe that the phase of the signal of $f_1$ is at zero degrees, it is really at 10. When we believe that the phase of the signal of $f_2$ is at zero degrees, it is really at 30.

We set up a distance $d_1$=10 mms. For $f_1$ we obtain (n+$\phi_1$/360)=13.3333 cycles, so $\phi_1$=120°. The measured $\phi_1$=120+10=130° ($\phi_{1measured}$=$\phi_{1distance}$+$\phi_{1offset}$). The measured $\phi_2$=144+30=174°. So $t_1$=$\Delta\phi$/(360$\Delta f$)=(174−130)/(360$\Delta f$)=12.2222 µSecs. The actual time should be 6.6666 µSecs.

We set up a second distance $d_2$=20 mms. For $f_1$ we obtain (n+$\phi_1$/360)=26.6666 cycles, so $\phi_1$=240°. The measured $\phi_1$=240+10=250°. The measured $\phi_2$=288+30=318°. So $t_2$=$\Delta\phi$/(360$\Delta f$)=(318−250)/(360$\Delta f$)=18.8888 µSecs. The actual time should be 13.3333 µSecs.

If we plot these as d as the x-axis and t as the y-axis we obtain a line with equation t=0.666d+5.5555. The slope (0.6666=1/1.5) is the velocity of sound measured as 1 mm per 0.6666 µSecs or 1/0.6666=1.5 mms/µSec. The intercept (5.5555 µSecs) is a measure of the relative phase between $f_1$ and $f_2$. Since $\Delta f$=10 KHz, 1 cycle=100 µSecs, and so 5.5555 µSecs 360(5.5555/100)=20° which is the relative phase (30−10) between the two frequencies.

If we had known the phase offset between the two frequencies (20°) then in the calculation of times we would have obtained for $t_1$ a new phase difference of (174−130−20)=24° giving a time for $t_1$=6.6666 µSecs. Similarly, for $t_2$ we obtain a new phase difference of (318−250−20)=48° giving a time for $t_2$=13.3333 µSecs, both of which are now correct.

Two points to note:
1. If we thought $d_1$ was 10 mms but it was actually say 12 mms and $d_2$ was 20 mms but it was actually 22 mms, then we obtain the phase offset as 15.2°; the slope is not affected. This might occur if the distance travelled within the transducers is not accounted for.
2. If the temperature changes and so v changes, this changes the slope but not the phase offset. For example if v=1.6 mms/µSec, then the equation becomes t=(1/1.6) d+5.5555=0.625d+5.5555.

FIG. 1 shows an embodiment of apparatus 100 for transmitting a signal, such as an acoustic signal. The apparatus 100 comprises a signal generator 110, a transmitter 120, and a receiver 130. The apparatus 100 further comprises a controller 140, having a processor 140a, and a memory 140b, configured in a known manner.

The controller 140 is in communication with the signal generator 110. The signal generator 110 is in communication with the transmitter 120 so as to transmit a signal across an undetermined distance, d. The receiver 130 is configured at a similar position to the transmitter 110 so as to receive a transmitted signal having been reflected from a target at the undetermined distance, as is exemplified in FIG. 1.

The target may be a reflector, or may be defined by a change in material (or material properties, such as density), or the like.

The receiver 130 is in communication with the controller 140 so as to determine the phase characteristics of the received signal. The phase characterizes may comprise the phase angle, the phase amplitude, or the like. In this example, the phase angles of the received signal are sampled at intervals using known techniques (such as using an analogue to digital converter so as to sample at timed intervals, which may allow the controller 140 to use discrete Fourier transform of the digitized signal).

In use, and following Method A (described above) the controller 140 provides (e.g. by evaluating) a first frequency component for a signal and a second frequency component for the signal. These frequencies components are based on the speed of the signal in the medium, and the unambiguous range, D (as described above).

It will readily be appreciated that the controller 140 may be configured to provide a first and second wavelength component of the signal. This may include, for example, estimating, guessing, or the like, the speed of a signal in the medium.

The transmitter 120 transmits the signal comprising the frequency components (one of which is exemplified as a single cycle pulse 150a in FIG. 2). The signal is transmitted through the medium and reflected from a target to the receiver 130, such that it travels the undetermined distance.

It will be readily apparent that should the distance from the apparatus 100 the to target be required/desired, then this would be half, or roughly half, the undetermined distance, d.

The receiver 130 receives the signal. The received signal is sampled at a number of sample intervals. It will be appreciated that the first sample may not coincide with the beginning of the reflected signal, but may be at some initial phase (i.e. depending of sampling rate).

Here, the signal generator 110 is communication with the controller 140 such that the phase 200b of the first frequency component of a received signal can be compared with the phase 200a that a first frequency component of a transmitted signal (had it not been merely a single cycle) would have been transmitted at that time of that sampling. This received phase is exemplified in FIGS. 3a and 3b for that frequency component. The (compared) phase $\phi_1$ is considered to be the difference in phase between these two (e.g. 32 degrees).

In a similar manner, the apparatus 100 is configured to observe the received phase $\phi_2$ of that the second frequency component of the signal based on the phase that the signal would have been transmitting at that time.

Of course, it will readily be appreciated that in some embodiments, only the difference in phase ($\phi_2-\phi_1$) is required to be determined. In such cases, this differential measurement may be made without reference to the phase of the transmitted frequency component (i.e. the controller 140 need not know the phase of a transmitted frequency component where it to have been transmitted at the time of sampling of the received signal).

After the phase angles (or phase difference) have been determined, the undetermined distance can be provided (e.g. by the controller 140 using the methods described above).

It will readily be appreciated that the apparatus 100 may be configured to transmit more that two frequency components, such as three, four, five, six, ten, fifty, etc. or any number therebetween (e.g. when implementing Method A(i), described above). Similarly, the apparatus 100 may be configured to use any of the further methods described above. For example, the apparatus 100 may be configured transmit a first frequency component based on Method B, and vary the frequency component transmitted to a second frequency so as to provide for determining the undetermined distance.

In some embodiments, the apparatus 100 may be provided by alternative configurations, as exemplified by FIG. 4. In FIG. 4a, the transmitter 120 and receiver 130 are provided by a common transducer 150. Here, the controller 140 is configured to time the transmission and receipt of signals.

FIG. 4b shows a configuration in which the undetermined distance is the distance between the transmitter 120 and receiver 140 (i.e. rather than being reflected), while FIG. 4c shows the transmitter and receiver configured in an angled arrangement (i.e. with respect to an reflective location).

It will readily be appreciated that in some configurations two or more of the frequency components may be communicated separately (i.e. temporally spaced), and/or may be communicated together (e.g. being commutative). Similarly, more than one signal may be transmitted/received.

A Further Example

In order to evaluate the theory, two transducers were used. One acted as a transmitter 120 and the other as a receiver 130. They had a centre frequency of 2 MHz and a bandwidth of about 1 MHz. Four frequencies were used, 1.50, 1.51, 1.60 and 2.50 MHz. The transducers were placed on carriages on a sliding straight track in a small water tank. Distances between the transducers of 25, 50, 75 and 100 mms were used. These were the undetermined distances. These distances were set up by hand using vernier calipers. At each distance approximately 100 pulses were used. Each pulse was 200 µSecs long consisting of all four frequencies with no windowing. The sampling frequency was set at 16 MHz ($f_s$) giving 3200 samples. The 3200 samples were captured and only the last 1600(N) samples were used. A Discrete Fourier Transform (DFT) was then used on these samples to obtain the amplitude and phase at each of the four frequencies.

It is important to note that using this technique allows the delay time (travel time) to be accurately detected. The resolution of the scheme was ($f_s$/N) 10 KHz allowing all four frequencies to be on exact frequency bins (150, 151, 160, 250). Furthermore, since effectively there was no window this allowed optimal estimation. The spread of phases for 1.50 MHz is shown in FIG. 5. It may be noticed that there is a slight drift upwards in these phases and this is due to temperature increasing as the transmitter pulses. The phase (and hence the velocity of sound) is very sensitive to temperature as was determined in a later experiment. This drift was similar for all frequencies. Note that the phases were corrected from those obtained by the DFT by 180–$\phi$ since the signals undergo a phase shift of 180° in the transmit/receive process. Note also that the DFT reports phase with respect to cosine and a sine was used for the signals. Sine is returned as a phase of –90° relative to cosine by the DFT. This was not corrected for since relative phase differences were used.

Figure 6:
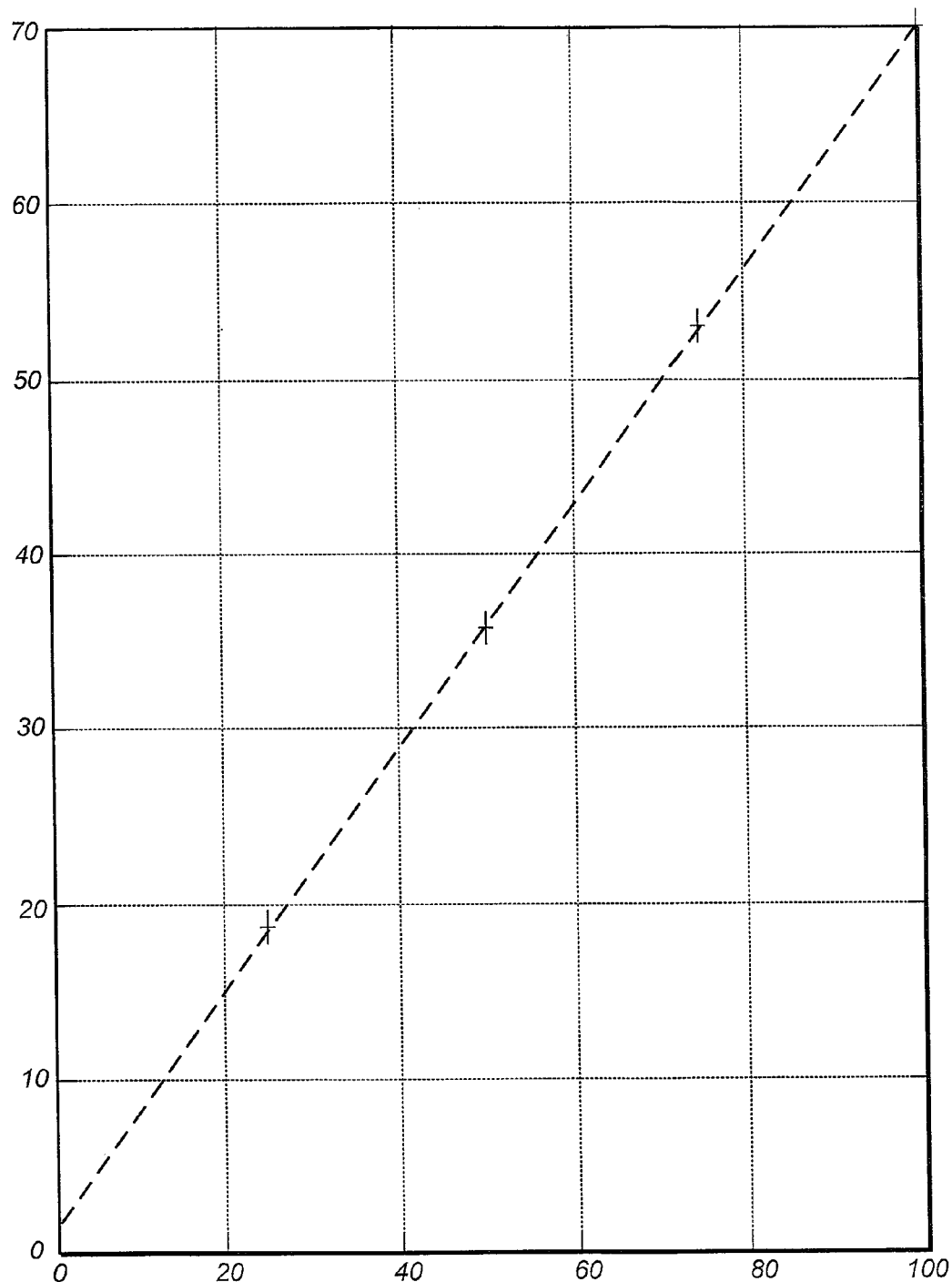
FIG. 6 is a time v. distance plot of least squares straight line for frequency pair $f_1 f_4$.

Having obtained the phases, these were converted to six sets of times, one for each possible pair of frequencies, i.e. $f_1f_2$, $f_1f_3$, $f_1f_4$, $f_2f_3$, $f_2f_4$, $f_3f_4$. For each pair, a least squares straight line fit was then made to give an equation of the form t=md+c. t is time in µsecs, d is distance in mms. The slope m is the velocity of sound in units of µSecs/mm, the inverse being the conventional mms/µSec. The intercept c is a time (µSecs) and this is converted to a relative phase for that frequency pair. For example, for frequency pair $f_1f_4$ the straight line is t=0.686097d+1.334252. This gave a velocity of sound of 1.457520 mms/µSec and a relative phase offset between $f_1$(1.50 MHz) and $f_4$(2.50 MHz) of ((1.334252/(2.5–1.5))*360) mod 360=120.33°. A graph of the data for this pair is shown in FIG. 6 for 620 data points and the least squares straight line fit.

All the times for a particular distance were very close. For example, the times for the 110 mm distance and using frequencies $f_1 f_4$ were within 10 nanoseconds over 199 separate pulses.

Having got this relative phase offset for each frequency pair, this was then used to remove these offsets and give a least squares fit for time against distance which passed through the origin.

The velocities were 1.457 mms/μsec. to within 0.001 mm/μsec. The corrected phase offsets all agreed, that is the phase offsets for pairs $f_1 f_2$, $f_2 f_3$, $f_3 f_4$ added to give the same phase offset as $f_1 f_4$.

Note on Received Signal Sampling

To achieve accuracy and avoid difficulties relating to identifying the start and end of a received signal it is preferred that the received signal is sampled intermediate between start and end of the signal, as described with reference to the further example set out below.

As above, we shall assume that sound is travelling through water. The nominal speed of sound in water (v) is 1500 msec, which is 1.5 mms/micro(μ) sec.

First we choose a range (R) which will be our unambiguous range. Any distances less than this can be determined unambiguously. As an example, if we choose R=150 mms, then from the formula R=v/Δf, then Δf=10000 Hz or 10 KHz or 0.01 MHz. Δf is the difference in frequencies we wish to transmit.

Let us arbitrarily choose 2 frequencies as $f_1$=1.50 MHz and $f_2$=1.51 MHz. These are chosen to be within our transducer/electronics transmit (TX)/receive (RX) bandwidth. Note that $\Delta f = f_2 - f_1 = 0.01$ MHz. which allows us to measure distances unambiguously up to 150 mms.

Now we have set Δf=0.01 MHz we must be able to perform a Fourier transform (FT) which will resolve these two frequencies. The FT resolution is given by $f_s/N$ where $f_s$ is sampling frequency and N is the number of samples used in the analysis. The sampling frequency must be greater than twice the highest frequency in the signal. This is sometimes called the Nyquist criterion.

Figure 7:
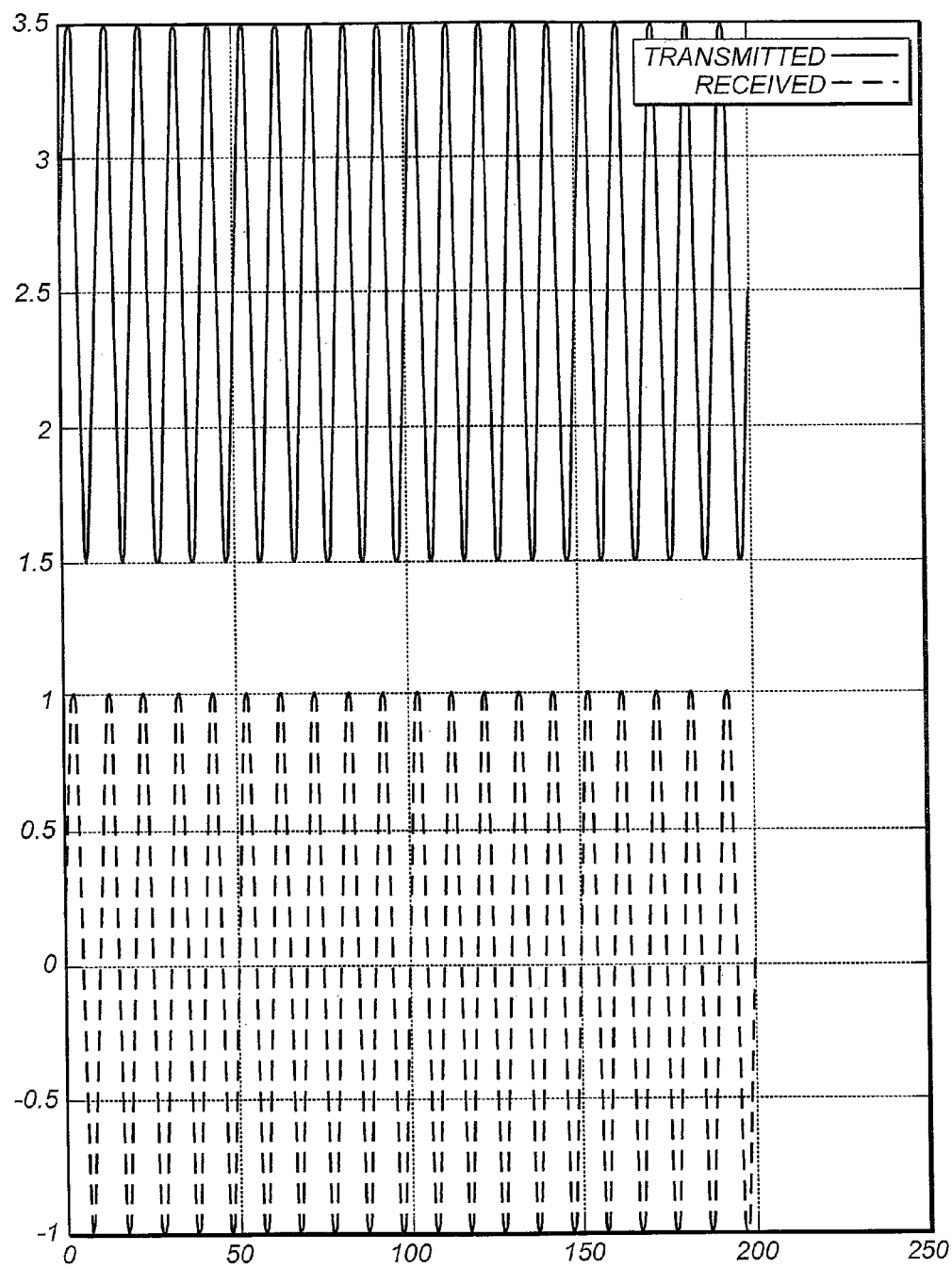
FIG. 7 shows transmit/receive signals amplitude plotted against time (µSecs) TX/RX distance=0 mms.

Before deciding on $f_s$ and N, consider how long our signal should be. The maximum range is 150 mms. which would take 100 μSecs to travel using sound. When we start transmitting we also start the receive sampling at the same instant (time 0). If there was 0 distance between TX and RX we would see FIG. 7, where the transmit signal is shown plotted above the receive signal.

Note that we are looking at 250 μSecs of time and we have transmitted a signal 200 μSecs long (twice the time required to cover our unambiguous range distance).

Figure 8:
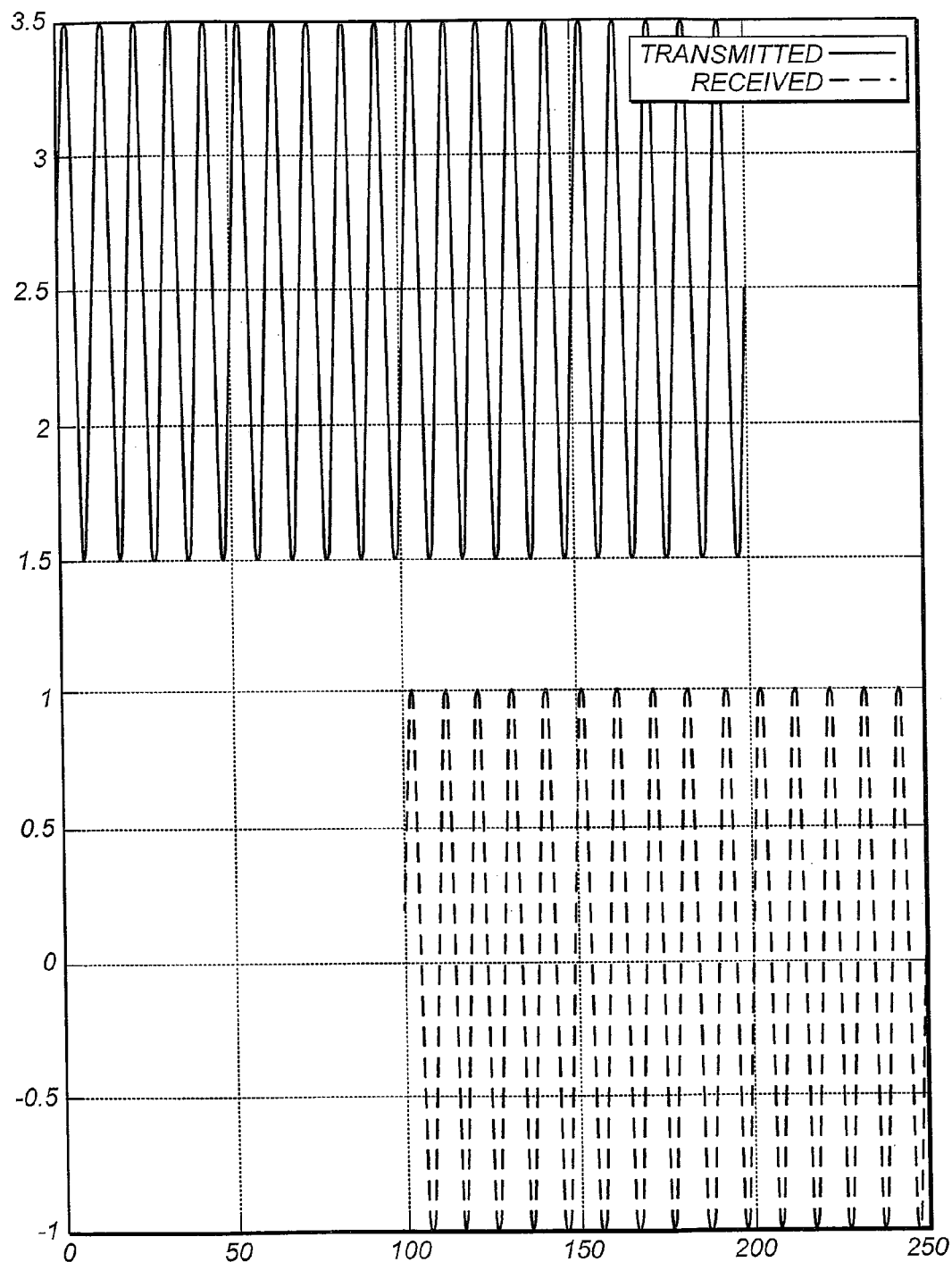
FIG. 8 shows transmit/receive signals amplitude plotted against time (µSecs) TX/RX distance=150 mms.

If the receiver were 150 mms away we would not start to receive it until after 100 μSecs had passed and we might see the situation depicted in FIG. 8.

So now we see what our receive signal might look like at the extremes of our range (R). If we consider a window between 100 and 200 μSecs we observe that we always see a complete part of the signal. Let us therefore choose a signal length of twice the time it would take to cover our range (R). In this case 200 μSecs. Note that even though we stop sampling at 200 μSecs, samples might still be coming into the receiver but we ignore them.

Figure 9:
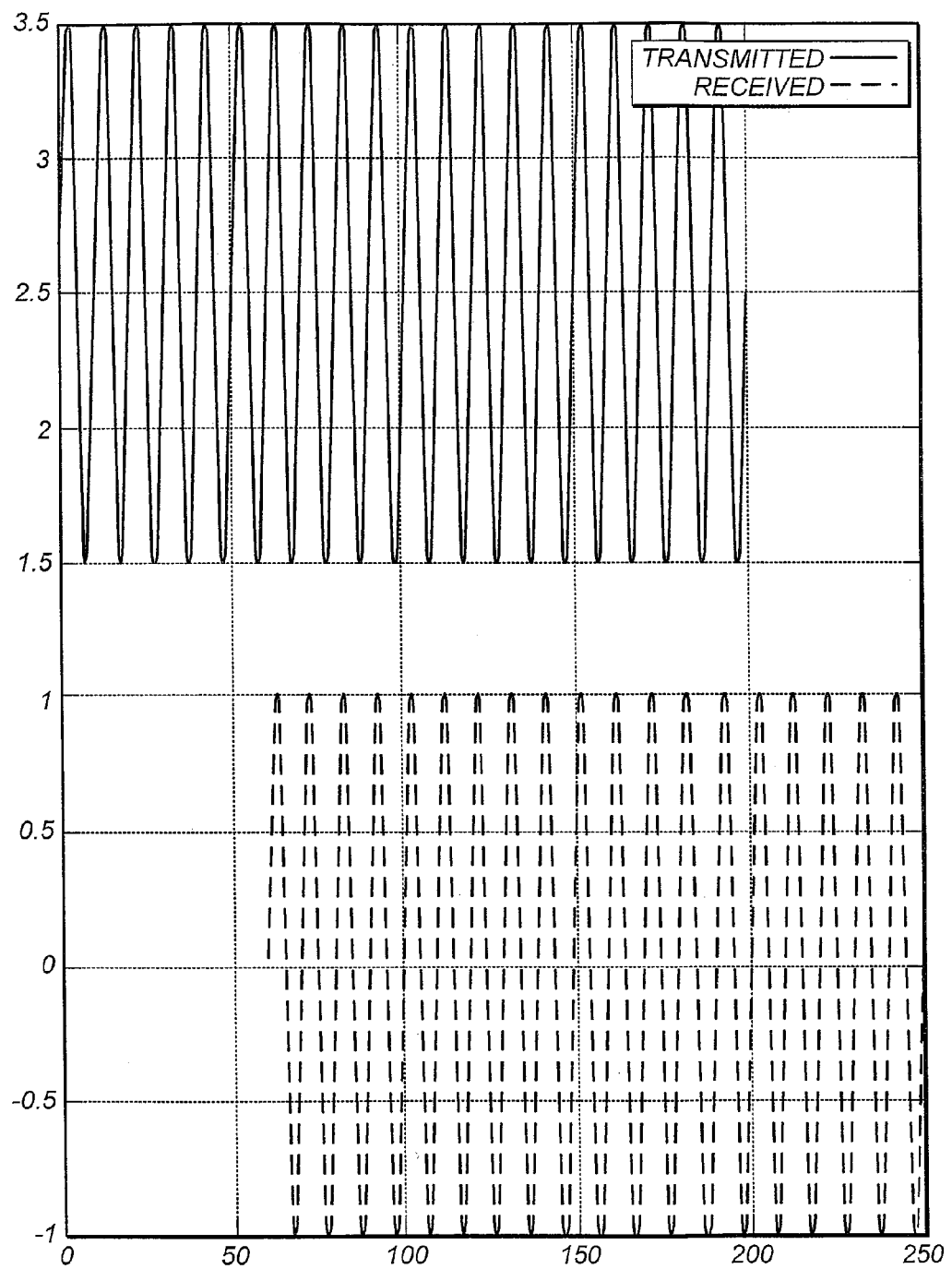
FIG. 9 shows transmit/receive signals amplitude plotted against time (µSecs) TX/RX distance=90 mms.

If we have a TX/RX distance somewhere within our range, say 90 mms (the start time into the receiver would be (60 μSecs)) we would see something like that in FIG. 9.

We have noted that we will only use the samples seen in our 100-200 μSec window. We insist that the number of cycles within this 100 μSec window must be an integer number for our selected frequencies to satisfy the FT criterion that in the resulting analysis they will fall on one of the FT bins. With the 2 frequencies selected $f_1$=1.50 MHz this has 150 cycles in 100 μSecs and $f_2$=1.51 MHz has 151 cycles.

Let us go back to choosing $f_s$ and N. We shall include other frequencies into our signal for more accuracy $f_3$=1.60 MHz and $f_4$=2.50 MHz. Note that the difference between $f_1$ and $f_2$ was 0.01 MHz. The difference between $f_1$ and $f_3$ is 0.1 MHz, and the difference between $f_1$ and $f_4$ is 1.0 MHz, that is steps of 10. So our highest frequency is 2.50 MHz and $f_s$ must be at least twice this. Let us be safe and choose $f_s$=16 MHz. Our signal will be 200 μSecs long, so N=16,000,000*200*$10^{-6}$=3200 samples. However, we shall only use 100 μSecs of data, the length of our viewing window, so N for our FT analysis will be 1600. This then gives us a frequency resolution of $f_s/N$=10,000. Thus, 1.50 MHz will be seen exactly on bin 150 and frequency 1.51 MHz will be seen exactly on bin 151.

Also, because we always have a full viewing window there will be no errors caused by our signal not occupying the full FT signal.

So now we have chosen our rangeR, our frequencies ($f_1 \ldots f_4$), sampling ($f_s$) and number of samples N) to satisfy our FT analysis procedure for optimal accuracy. We can therefore transmit/receive and analyse to obtain our four phases ($\phi_1 \ldots \phi_4$).

Using frequencies $f_1$, $f_2$, these have been chosen to be at most one cycle difference within our unambiguous range (R), we obtain $\Delta\phi = \phi_2 - \phi_1$. The time for a distance (D<R) is $t = (\Delta\phi/360)/\Delta f$, where we measure the phases in degrees.

If Δφ is negative we simply add 360 to it and use this for Δφ. The fact it may be negative indicates that Δn in our time equation is 1. If Δφ were positive then this indicates that Δn is 0. Recall that the full equation for time/phase is $t = (\Delta n + \Delta\phi/360)/\Delta f$, where Δn is the difference in the number of integer cycles between the two frequencies.

Having got an estimate of the time using frequencies $f_1$, $f_2$ we now use the pair $f_1$, $f_3$. Now, however Δn may be up to 10 cycles difference. We try each Δn from 0 to 10 and the one which gives the closest match to our first estimate is the new best estimate. We can then use another pair of frequencies, $f_1$, $f_4$ and now Δn may be up to 100. However, we know an estimate for this from our previous value of Δn. For example, if our last estimate was Δn=5, then now Δn must be between 40 and 60. We again get the closest match in time for various Δn and the one closest is now new best estimate.

Having got t (in say μSecs) for this D (in say mms) we can repeat this for other values of D and fit a straight line of the graph between t and D. Note that this graph is for a pair of frequencies and a similar graph can be obtained for each frequency pair. The slope is an estimate of the velocity of sound in μSecs/mm. This is inverted to give the estimate in the more usual form of mms/μSec. The intercept (in μSecs) is a measure of the phase offset. The phase offset in degrees is intercept ((μSecs)×Δf (MHz)×360). This now allows us to correct for the phase offset between these two particular frequencies. Doing this for many frequencies we can get a phase/frequency calibration graph for this material, in this case water.

It will be appreciated to the skilled reader that the features of particular apparatus may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory.

It will be appreciated that any of the aforementioned apparatus 100 may have other functions in addition to the mentioned functions, and that these functions may be performed by the same apparatus. The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

It will be understood that various omissions, substitutions and changes in the form and details of the apparatus and methods described may be made by those skilled in the art without departing from the spirit of the invention. For example, it is expressly intended that all combinations of those apparatus and/or method steps that perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A method for determining a distance travelled by a signal between a transmitter and a receiver in a medium, the method comprising:
    considering an unambiguous range, the unambiguous range greater than a distance to be travelled by a signal between the transmitter and the receiver;
    transmitting a signal from the transmitter to the receiver across the distance to be determined, the signal comprising at least three frequency components, the frequency components including:
        at least first and second frequency components being based on the unambiguous range and the speed of the signal in the medium such that the number of cycles of the first and second frequency components that may be accommodated in the distance travelled by the signal between the transmitter and a receiver varies by no more than one, and
        at least a third frequency component selected such that the number of cycles of the first and third frequency vary by more than one in the distance travelled by the signal between the transmitter and a receiver;
    receiving the signal at the receiver; and
    determining, using a controller in communication with the receiver, a first estimate of the distance travelled by the signal between the transmitter and the receiver by using the variance of the received phase characteristics of the first frequency component with the received phase characteristics of the second frequency component; and
    determining, using the controller, the distance travelled by the signal between the transmitter and the receiver by using variance of the received phase characteristics of the first frequency component with the received phase characteristics of the third frequency component, as well as the first estimate of the distance travelled by the signal.

2. The method according to claim 1, wherein the method comprises comparing the difference in the received phase characteristics of the frequency components so as to provide for determining the distance travelled by the signal.

3. The method according to claim 1 comprising transmitting and receiving a signal comprising more than three frequency components, each frequency component being incrementally different from another frequency component.

4. The method according to claim 1 or 3, wherein each frequency component is incrementally different from another frequency component so as to provide a Vernier effect when determining the distance travelled by the signal.

5. The method according to claim 1 or 3, wherein the received phase characteristic of a first frequency component is used with the received phase characteristic of each other frequency component in the signal so as to provide for determining the distance travelled.

6. The method according to claim 1, wherein the distance travelled by the signal is the distance to one or more targets.

7. The method according to claim 1, wherein the method further comprises determining the time of flight of the signal.

8. The method according to claim 1, wherein the signal is an acoustic signal.

9. The method according to claim 1 wherein the distance is a distance in a pipeline, such as an oil and gas pipeline, or a subterranean distance.

10. The method according to claim 1 wherein the at least two frequency components are transmitted simultaneously, or at intervals.

11. The method according to claim 1 wherein a plurality of signals are transmitted and received in order to determine the distance travelled by the signals.

12. The method according to claim 1 wherein the variance of the received phase characteristics of a frequency component in the received signal are determined by comparing a sampled phase of the received frequency component with a transmitted phase characteristic, or expected transmitted phase characteristic, of that frequency component.

13. The method according to claim 1 wherein the variance of the received phase characteristics of the at least three frequency components in the received signal are determined by comparing a sampled phase of one received frequency component with a sampled phase of another received frequency component.

14. The method according to claim 1 wherein the method further comprises compensating for phase error in the at least three frequency components so as to determine the distance.

15. The method according to claim 1, wherein the at least three frequency components are provided by providing at least three wavelength components.

16. The method according to claim 15, wherein the speed of the signal in the medium is known, estimated, or guessed in order to provide the at least three wavelength components.

17. A computer implemented method for determining a distance travelled by a received signal having been transmitted between a transmitter and a receiver in a medium, the received signal having at least three frequency components, the method comprising:
- determining, using the computer, a first estimate of a distance travelled by a received signal by using a variance of received phase characteristics of a first frequency component together with received phase characteristics of a second frequency component, wherein the first and second frequency components have been based on an unambiguous range, that unambiguous range being greater than the distance travelled by the received signal, such that the number of cycles of the first and second frequency components accommodated in the distance travelled by the received signal vary by no more than one, and
- determining, using the computer, the distance travelled by the received signal by using a variance of received phase characteristics of the first frequency component together with received phase characteristics of a third frequency component, as well as the first estimate of the distance travelled by the received signal, the third frequency component having been selected such that the number of cycles of the first and third frequency components vary by more than one in the distance travelled by the signal between the transmitter and a receiver.

18. The method according to claim 17 wherein the method additionally comprises determining the distance to one or more targets.

19. The method according to claim 17, wherein the received phase characteristic is the received phase angle of the frequency component.

20. A computer program provided on a computer readable medium, the computer program configured to provide the method of claim 1.

21. Apparatus for determining a distance travelled by a signal in a medium, the apparatus comprising:
- a transmitter configured to transmit a signal comprising at least three frequency components, wherein at least first and second frequency components are based on an unambiguous range, which is greater than the distance travelled by the received signal, and the speed of the signal in a medium, such that the number of cycles of the first and second frequency component that can be accommodated in the distance travelled by the signal between the transmitter and a receiver varies by no more than one, and
- wherein at least a third frequency component is provided such that the number of cycles of the first and third frequency components vary by more than one in the distance travelled by the signal between the transmitter and a receiver;
- a receiver configured to receive a transmitted signal comprising the at least three frequency components; wherein the apparatus is configured to determine, using a controller in communication with the receiver, a first estimate of a distance travelled by a signal by using the variance in received phase characteristics of the first frequency component of received signal with received phase characteristics of the second frequency component of received signal, and configured to determine, using the controller, the distance travelled by the signal between transmitter and receiver by using a variance of the received phase characteristics of the first frequency component with the received phase characteristics of the third frequency component, as well as the first estimate of the distance travelled by the signal.

22. The apparatus according to claim 21, wherein the apparatus is configured to compare the difference in received phase characteristics of frequency components so as to provide for determining the undetermined distance.

23. The apparatus according to claim 21, wherein the apparatus is configured to compare received phase characteristics of the at least two frequency components to be the roughly same by being configured to change at least one of the frequency components in a transmitted signal so as to determine a distance travelled.

24. The apparatus according to claim 21, wherein the received phase characteristic is the received phase angle of the frequency component.

25. A measurement device comprising the apparatus according to claim 21, such as an oil and gas measurement device, or subterranean measurement device.

26. Means for determining a distance travelled by a signal in a medium, the means for determining a distance comprising:
- a means for transmitting a signal, the means for transmitting configured to transmit a signal comprising at least three frequency components,
- wherein at least first and second frequency components are based on an unambiguous range, which is greater than the distance travelled by the received signal, and the speed of the signal in a medium such that the number of cycles of the first and second frequency components that can be accommodated in the distance travelled by the signal between the transmitter and a receiver varies by no more than one, and
- wherein at least a third frequency component is provided such that the number of cycles of the first and third frequency components vary by more than one in the distance travelled by the signal between the transmitter and a receiver;
- a means for receiving a signal, the means for receiving configured to receive a transmitted signal comprising the at least three frequency components, and
- means for determining a first estimate of a distance travelled by a signal by using the variance in a received phase characteristics of the first frequency component of a received signal with a received phase characteristics of the second frequency component of a received signal, and means for determining the distance travelled by the signal between transmitter and receiver by using a variance of the received phase characteristics of the first frequency component with the received phase characteristics of the third frequency component, as well as the first estimate of the distance travelled by the signal.

27. Apparatus configured to determine a distance travelled by a signal between a transmitter and a receiver in a medium, the signal having at least three frequency components, the apparatus comprising a controller configured to determine a first estimate of the distance travelled by a received signal by using a variance of a received phase characteristic of a first frequency component together with a received phase characteristic of a second frequency component, wherein the first and second frequency components have been based on an unambiguous range, that unambiguous range being greater than the distance travelled by the received signal, such that the number of cycles of the first and second frequency components accommodated in the distance travelled by the received signal vary by no more than one, the apparatus further configured to determine the distance travelled by the received signal by using a variance of a received phase characteristic of the first frequency component together with a received phase characteristic of a third frequency component, as well as the first estimate of the distance travelled by the received signal, the third frequency component having been selected such that the number of cycles of the first and third frequency components vary by more than one in the distance travelled by the signal between the transmitter and a receiver.

* * * * *